March 10, 1936.  L. L. SCHAUER ET AL  2,033,484
LIMIT DEPTH GAUGE
Original Filed Jan. 19, 1932
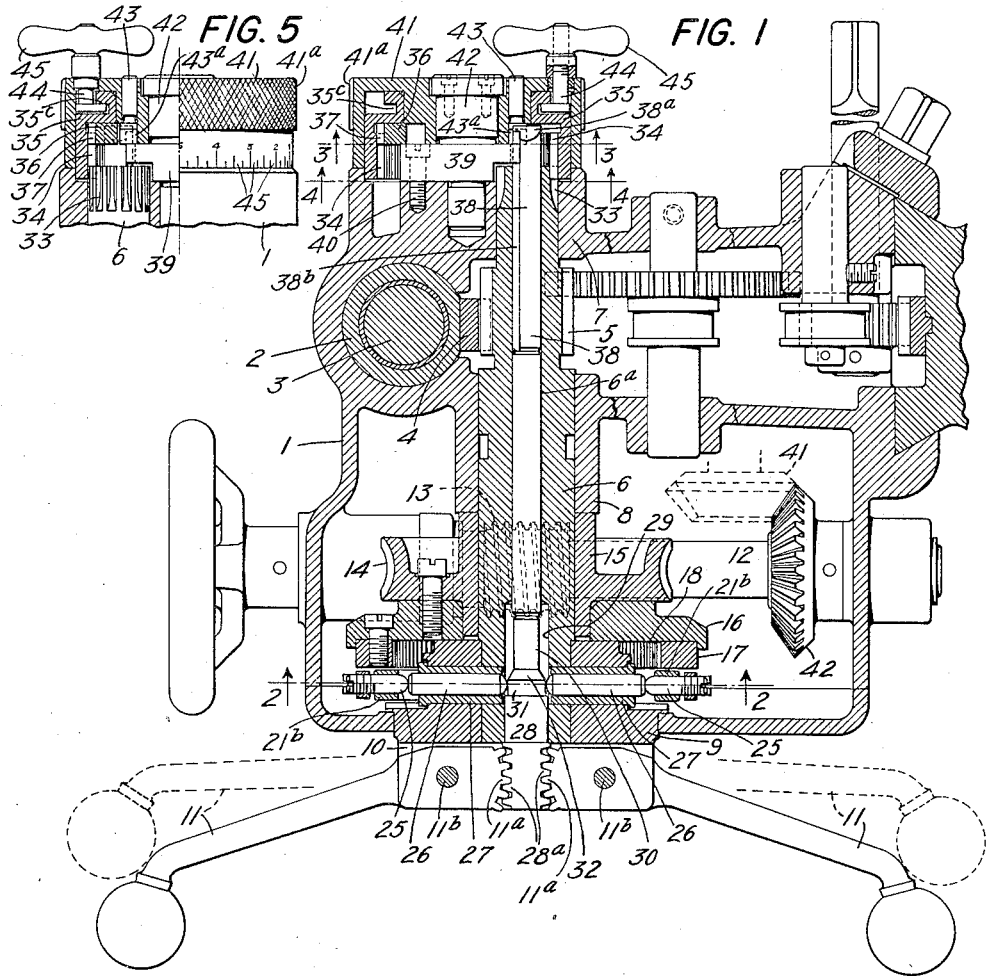
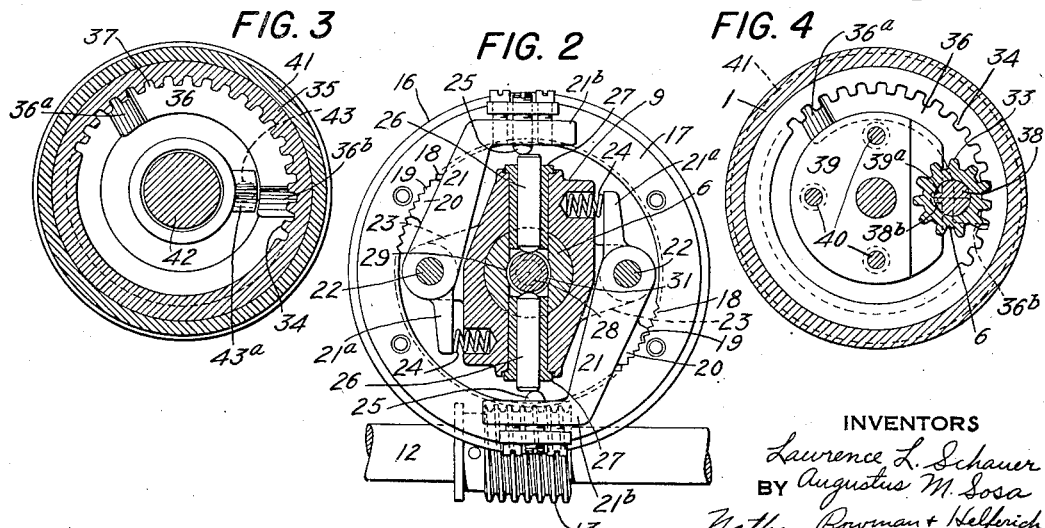
INVENTORS
Lawrence L. Schauer
BY Augustus M. Sosa
Nathan, Bowman & Helferich
ATTORNEYS Patented Mar. 10, 1936

2,033,484

UNITED STATES PATENT OFFICE 2,033,484

LIMIT DEPTH GAUGE

Lawrence L. Schauer, Wyoming, and Augustus M. Sosa, Cincinnati, Ohio, assignors to The Cincinnati Bickford Tool Company, Cincinnati, Ohio, a corporation of Ohio Original application January 19, 1932, Serial No. 587,532. Divided and this application June 18, 1934, Serial No. 731,130

8 Claims. (Cl. 77—33)

The invention forming the subject matter of the present application, which is a division of application, Serial No. 587,532, filed January 19, 1932, relates to a device known in the trade as a "depth gauge", that is, a device adapted to limit the axial movement of a tool spindle. Devices of this nature are commonly used in drilling and tapping machines for limiting the feeding movement of the tool spindle, thereby to predetermine the depth of the hole to be drilled or tapped.

The primary object of the present invention is to provide an improved and simplified depth gauge, which will not only throw out the power feed at the predetermined point thereby to limit to a predetermined amount the feeding movement of the tool spindle, but which also will automatically serve as a safety limit trip to throw out the power feed when the tool spindle has reached either an extreme upper or an extreme lower position.

Another object of this invention is to provide a simplified means whereby the relative positioning of the safety devices for throwing out the power feed at the extreme upper and lower positions of the spindle may be varied, thereby to cause the power feed to be thrown out at fixed points intermediate the extreme positions of the spindle, together with manually adjustable means for automatically discontinuing the feed at any desired point intermediate said fixed points.

Still another object of the invention is to provide a power actuated feeding mechanism capable of giving to a tool spindle a predetermined maximum range of travel and to combine therewith simplified means for selecting from that maximum range an operating range less than the maximum and located anywhere therein.

These objects have been attained by so constructing a depth gauge that an element thereof, which is actuated by the power feed, is given less than one complete rotation for a complete translatory movement of the tool spindle. This element carries with it a member providing a plurality of cam devices each adapted to throw out the clutch which controls the power feed. The cam devices are so arranged that one releases the power clutch when the spindle is moving downwardly and the other releases the clutch when the spindle is moving upwardly. The member which provides the cam devices for releasing the power clutch preferably is of arcuate form and has a self-locking engagement with an internal gear actuated by the power feed, the cam devices preferably being formed at each end of the arc.

In one embodiment of the invention the arcuate member is of such length and is so associated with the spindle feed mechanism that a cam on one end thereof throws out the power clutch just before the spindle feed pinion reaches the lower end of the spindle feed rack and the other cam throws out the clutch just before the pinion reaches the upper end thereof. With this arrangement the spindle may be given its extreme translation and the cams serve as upper and lower safety limit trips.

In another embodiment of the invention the arcuate member may be longer than as above described and therefore limit the movement of the spindle to somewhat less than the maximum travel. The improved depth gauge is so constructed that any one of a plurality of such arcuate members readily may be inserted therein to provide safety limit trips at any desired points within the maximum travel of the spindle.

In addition to the safety limit trip for the spindle, the improved depth gauge also includes another clutch throw-out device capable of manual adjustment and adapted to disconnect the power feed at any desired predetermined point intermediate the limits set by the above mentioned limit trips.

Other objects and advantages will be in part indicated in the following description and in part rendered apparent therefrom in connection with the annexed drawing.

To enable others skilled in the art so fully to apprehend the underlying features hereof that they may embody the same in the various ways contemplated by this invention, a drawing depicting a preferred typical construction has been annexed as a part of this disclosure and, in such drawing, like characters of reference denote corresponding parts throughout all the views, of which:—

Figure 1 is a horizontal sectional view of a machine tool head embodying the present invention.

Fig. 2 is a section on the line 2—2 of Fig. 1 showing more particularly, the clutch for controlling the power feed.

Fig. 3 is a section on line 3—3 of Fig. 1 showing particularly the arcuate member which affords the upper and lower limit trips, its self-locking engagement with its supporting gear, and the manually adjustable trip for disconnecting the power feed at any point intermediate the extremes determined by the limit trips.

Fig. 4 is a section on line 4—4 of Fig. 1.

Fig. 5 is a sectional elevation of the improved depth gauge with certain ones of the parts thereof shown as rotated 180° about the axis of the depth gauge from the positions shown in Fig. 1.

Referring more specifically to the drawing the invention is disclosed as embodied in a machine tool head 1, within which is translatably mounted a spindle sleeve 2, having a tool spindle 3 rotatably journaled therein. The tool spindle is held against axial movement relative to the spindle sleeve, and conventional means (not shown) may be provided for rotating the spindle in the spindle sleeve. Suitable means also may be provided for counterbalancing the spindle and its supporting sleeve. Inasmuch as the spindle rotating means and the spindle counterbalancing means form no part of this invention illustration and detail description thereof is deemed unnecessary. For the purposes of this disclosure the term "spindle" may include both the spindle proper and its translating sleeve.

Fixed to the spindle sleeve 2 is a feed-rack 4 the teeth of which are engaged by the teeth of a pinion 5 formed on a feed shaft 6 journaled horizontally in the head 1, in bearings 7 and 8. To the forward end of the shaft 6 there is secured a hub member 9, having a slotted portion 10, within which are pivotally mounted a pair of hand levers 11. The spindle sleeve 2 and the spindle 3 therein may be translated in the head by manually rotating the levers 11 about the axis of the shaft 6 thereby rotating the hub 9, shaft 6 and pinion 5. This manual translation is commonly employed to effect rapid traverse of the spindle to bring the tool to the work preparatory to a machining operation and to retract the tool therefrom after the operation has been completed.

Power means also is provided for translating the spindle in either direction at a relatively slow or feeding rate. This power means includes a shaft 12 journaled in the head 1 transversely of the shaft 6 and carrying a worm 13. Any suitable power means may be provided for rotating the shaft 12 such, for example, as that disclosed in the parent application Serial No. 587,532, including a gear 42 on the shaft 12 and a driving gear 41 meshing therewith. For clearness of illustration the latter gear is indicated in dotted lines 90° out of its normal position. Preferably the power feed is taken from the rotation of the tool spindle and is reversible therewith as is common in this type of machine tools.

The worm 13 engages and rotates a worm wheel 14 having a hub 15 rotatably journaled on the feed shaft 6. Clutch means is provided for securing the worm wheel to the feed shaft to effect power feed of the spindle. This clutch means includes a flange member 16 secured to the worm wheel 14 and an annular ring 17 secured to the flange member and provided with serrations or teeth 18 formed on its inner periphery. The teeth 18 are adapted to be engaged by complemental teeth 19 formed on projections 20, of clutch levers 21. These levers are fulcrumed on pins 22 fitted in ears 23 forming a part of the hub member 9 fixedly secured upon the forward end of the spindle feed shaft 6. Coil springs 24 interposed between the rear ends 21ª of the levers 21 and the hub member 9 normally serve to swing the levers to a position in which the teeth 19 are disengaged from the teeth 18 of the ring 17. The forward ends 21ᵇ of the levers are provided with adjustable contact screws 25 which engage the outer ends of push pins 26 slidingly mounted in bushings 27 fitted in the hub member 9. The inner ends of the pins 26 engage the periphery of an axially movable clutch actuating cam rod 28 fitted within a bore 29 formed in the forward end of the spindle feed shaft. This cam rod is provided with smaller and larger cylindrical portions 30 and 31 respectively connected by a conical cam portion 32. When the rod is in its outermost position the push pins engage the portion 30 and the springs 24 are permitted to swing the levers 21 to disengage the clutch teeth 18 and 19. When the rod 28 is moved inwardly to the position shown in Fig. 1, by swinging the levers 11 from their dotted line positions to their full line positions, the conical portion 32 pushes outwardly on the pins 26 which, in turn, swing the levers 21 to engage the clutch teeth 18 and 19 thereby to effect a power drive from the shaft 12 to the shaft 6. Due to the contact of the pins 26 with the straight wall of the portion 31 of the rod 28 the clutch teeth 18 and 19 will be maintained in engagement and therefore the power feed will be maintained effective until the rod 28 is again moved outward. The outer end of the rod 28 is formed with rack teeth 28ª, which are engaged by the teeth 11ª of gear segments formed on the levers 11 pivotally mounted on pins 11ᵇ carried by the hub member 9. From the foregoing it will be perceived that the levers 11 perform two functions, to wit:— to rotate the shaft 6 to effect rapid traverse of the tool spindle, and when swung about the fulcrum pins 11ᵇ to connect or disconnect the power feed clutch.

This invention provides improved means, now to be described for obtaining any desired axial movement of the spindle under the power feed; for automatically throwing out the power feed when that predetermined movement has been effected, and as a safety feature, for throwing out the power feed when the spindle has reached predetermined high and low positions whether or not the predetermined feeding movement has been obtained. This has been accomplished by providing, on the inner end of the spindle feed shaft 6, a pinion 33 the teeth of which constantly engage the teeth of an internal gear 34 formed in a rotatable sleeve member 35. The sleeve member carried an adjustable cam member 36 which is arcuately shaped and provided with teeth 37 adapted to fit into the teeth of the gear 34. Opposite ends of the cam member are provided with cam faces as 36ª, 36ᵇ adapted during opposite rotations of the gear 34, to engage the beveled end 38ª of a push rod 38 slidingly mounted in an axial bore 6ª of the shaft 6. The rod 38 abuts the rod 28 and, in effect, is substantially a continuation thereof. To prevent the rod 38 from rotating, while permitting it to be moved axially, the rod is formed on one side with a rib or spline 38ᵇ which slides in a groove 39ª formed in the periphery of a disk 39 secured to the head 1, as by screws 40.

The cam member 36 is adapted to be fitted into the teeth of the internal gear 34 in any desired angular position and is so constructed that it holds itself in place by its own formation. The ratio of the pinion 33 to the internal gear 34 is such that the gear 34, and the sleeve member 35 which carries it, are given less than one complete rotation for a complete translation of the tool spindle. As shown in the drawing the length of the member 36 is of such length and is so located within the internal gear that the cam face 36ª will engage the end 38ª of the rod 38 and shift the same axially, thereby to throw out the power clutch, when the spindle has reached its lower limit of travel and likewise the cam face 36ᵇ will similarly shift the rod 38 to disconnect the power clutch when the spindle has reached its upper limit of travel thereby affording a safety power throw-out at the two extreme positions of the spindle.

If desired, the member 36 may be made longer than as shown and thereby limit the movements of the spindle to something less than its maximum available movement, and as the member may be inserted in the gear 34 in any desired angular position it follows that this device may be utilized to select from the maximum range of travel of the spindle an operating range less than the maximum, which operating range may be located anywhere within the maximum range. For example, in machine tools so constructed that the spindle has a maximum axial movement of say, ten inches, the member 36 may be so constructed and so arranged in the gear 34 that it selects from that available ten inch movement an operating range of say, six inches, and that operating range selectively may be at either end of the maximum range or anywhere intermediate the ends thereof.

This arrangement may be particularly desirable for quantity production. For one class of work, it may be desirable that the spindle be projected a substantial amount below the tool head and be given a limited range of movement whereas for another class of work or under other conditions it may be desirable to have the spindle project but slightly from the tool head and in that position have a limited range of movement. Inasmuch as the cam member 36 may be easily inserted in any desired angular position within the gear 34 and holds itself therein without any additional locking means, the machine may be readily equipped with any one of a plurality of cam members of various lengths, or the angular position thereof in the gear 34 may be changed with very little difficulty.

As yet only the safety limit trips for the power feed have been described. This invention, however, also provides means for automatically throwing out the power feed at any desired point intermediate the extreme positions determined by safety limit trips. This means includes a manually and angularly adjustable dial member 41 rotatably journaled on a stud 42 projecting from the disk 39 secured into the tool head 1. This dial member is provided with a knurled periphery 41ª to facilitate manual adjustment of the member about the stud. Fixed within the dial member 41 is a stud or trip dog 43 having a cam face 43ª adapted, at a predetermined time, to engage the beveled end 38ª of the rod thereby to shift the rod axially and disconnect the power clutch. This device is employed in a drilling machine to throw out the power feed when the hole has been drilled to the desired depth. The desired depth is predetermined by the angular setting of the dial member 41 which is angularly adjustable about the sleeve member 35 but which may be locked thereto to turn therewith by means of a clamp bolt 44 having its head tracking an annular groove 35ᶜ in the member 35. A wing-nut 45, threaded on the bolt 44 serves to clamp the elements 35 and 41 together to cause them to turn as a unit under the action of the pinion 33 and internal gear 34.

The depth to which a hole will be drilled in any given setting of the dial 41 is indicated by suitable graduations 45 on the dial 41. These graduations cooperate with a suitable indicator or zero point on the tool head and discloses the amount of axial feed the spindle will be given before the dog 43 engages the rod 38 and throws out the power feed.

Should the operator inadvertently adjust the dial to give the spindle a feeding movement greater than the remaining available movement in the spindle, one of the safety limit cams 36ª or 36ᵇ will automatically throw out the feed before the pinion 5 has reached the end of the rack 4, thereby preventing damage to the machine.

From the foregoing it will be apparent that we have provided an improved and simplified means for regulating the amount of power feed of a tool spindle, as well as an improved and simplified safety upper and lower throw-out for the power feed.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:—

Having thus revealed this invention, we claim as new and desire to secure the following combinations and elements, or equivalents thereof, by Letters Patent of United States:—

1. In combination with feeding mechanism for a tool spindle having a rack thereon, a feed shaft, a feed pinion on said shaft engaging said rack and power means including a clutch for rotating said feed shaft, of a rod coaxial with said feed shaft and adapted upon axial movement in one direction to disengage said clutch; a second pinion formed on said shaft; a rotatable member having an internal gear in mesh with said second pinion, and an arcuate element having teeth formed upon its periphery adapted interlockingly to engage the teeth of said internal gear and having cam surfaces thereon adapted during rotation of said internal gear in opposite directions alternately to engage and shift said rod thereby to disengage said clutch, said arcuate element being adjustable to different angular positions within said internal gear thereby to vary the field of reciprocation of the tool spindle in increments proportional to the tooth pitch of the said internal gear.

2. In a machine tool, in combination with a translatable spindle, a rack thereon, a rotatable feed shaft, a pinion thereon engaging said rack, and power means including a clutch to rotate said feed shaft to effect translation of said spindle; of means for disengaging said clutch when said spindle reaches its extreme upper and lower positions, comprising a rod extending through said feed shaft and adapted by axial movement to disengage said clutch, a second pinion on said feed shaft, a relatively wide internal gear journaled eccentric to said feed shaft, one end of the teeth of said internal gear being engaged by said second pinion, and an arcuate element removably secured within said internal gear and fitted within the other end of the teeth of said internal gear and having on one end a cam adapted to shift said rod to disengage said clutch when said spindle reaches one extreme position and on its opposite end a second cam adapted to shift said rod to disengage said clutch when the spindle reaches its other extreme position.

3. In a machine tool, in combination with a translatable spindle, power actuated means including a rotatable feed shaft for effecting limited translation of said spindle in forward and reverse directions and a clutch for rendering said power means effective or ineffective; of means for automatically actuating said clutch to render said spindle translating means ineffective before said spindle reaches either its extreme advanced or retracted positions, including a rod extending through said feed shaft and adapted by axial movement to disengage said clutch; an internal gear member rotated by said feed shaft less than one complete rotation for a complete translation of said spindle, and an arcuate cam element removably secured within said member and provided at its opposite ends with two cam surfaces one adapted to engage and shift said rod when said spindle is being advanced and the other adapted to engage and shift the rod when the spindle is being retracted, said arcuate cam element being provided with a series of gear teeth on its outer periphery adapted interlockingly to engage the teeth of said internal gear member and adapted for adjustment angularly about the axis of said member simultaneously to vary the position of both of said cam surfaces relative to said rod in increments proportionate to the spacing of said teeth.

4. In combination with a translatable spindle, a rack thereon, a rotatable feed shaft, a feed pinion thereon engaging said rack, and power means including a clutch to rotate said feed shaft to effect translation of said spindle; of means for rendering said power feed ineffective at predetermined points in the forward and retractive movement of said spindle comprising a rod extending through said feed shaft and adapted by axial movement to disengage said clutch, a second pinion on said feed shaft, a member having an internal gear in mesh with said second pinion and adapted to be given less than one rotation for a complete translation of said spindle, and a cam element removably secured within said member and having cam surfaces thereon, one adapted to shift said rod during advance movement of said spindle and the other adapted to shift the rod during retractive movement of the spindle, said cam element being of arcuate form and having, on its outer periphery, teeth adapted to fit within the teeth of said internal gear and to hold said element in said gear by the engagement of said teeth.

5. In combination with feeding mechanism for a tool spindle having a rack thereon, a feed shaft, a feed pinion on said shaft engaging said rack, power means including a clutch for rotating said feed shaft, and manually actuable means for rendering said clutch effective; of automatic control means for said clutch adapted to render said power feed ineffective when said spindle has reached either of two extreme positions and manually adjustable means for automatically rendering said power feed ineffective at a predetermined point intermediate said extreme positions, said control means including a clutch actuating rod coaxial with said feed shaft and adapted by axial movement to disengage said clutch; a second pinion on said feed shaft; a first member having an internal gear in mesh with said second pinion, an arcuate element fitted within the teeth of said internal gear and having thereon two cam devices adapted to shift said rod when said spindle reaches either of its extreme positions; a manually adjustable dial member arranged coaxially with said first member and adapted to be adjusted angularly thereabout, a third cam device carried by said dial member and located between the first mentioned cam devices and adapted to engage and actuate said rod at a predetermined point intermediate the extreme positions of said spindle; and means to clamp said dial member to said first member.

6. In a machine tool, the combination of a translatable spindle, a rack thereon, a feed shaft, a first pinion on said feed shaft engaging said rack to effect translation of said spindle, the maximum range of available translation of said spindle being determined by the length of said rack, power means, including a clutch, to rotate said feed shaft, means to select from said maximum range an operating range somewhat less than said maximum and located at any desired place therein, said means including a clutch actuating rod coaxial with said feed shaft and adapted by axial movement to disengage said clutch; a second pinion on said feed shaft, a member provided with an internal gear meshing with and rotated by said second pinion, an arcuate element fitted within said member and having a self-locking engagement with the teeth of said internal gear, two cam devices provided by said cam element adapted alternately to engage and shift said rod upon upward and downward movement of said spindle, said two cam devices being spaced apart angularly a distance sufficient to limit the translation of said spindle to an operating range something less than its maximum, said arcuate element being adjustable angularly relative to said internal gear to vary the operating range relative to the maximum of travel of said spindle.

7. In a machine tool the combination of a translatable spindle, a rack thereon, a feed shaft, a first pinion on said feed shaft engaging said rack to effect translation of said spindle, the maximum range of available translation being determined by the length of said rack, power means, including a clutch, to rotate said feed shaft and safety limit trip means automatically to disengage said clutch thereby to render said power feed ineffective before said pinion engages the end of said rack, said means including a clutch actuating rod coaxial with said feed shaft and adapted by axial movement to disengage said clutch, a second pinion on said feed shaft, a rotatable member provided with an internal gear engaging said second pinion; a cam member of arcuate form having teeth on its outer periphery fitted within the teeth of said internal gear and held therein by the interlocking engagement of said teeth, and a cam device formed at each end of said cam member, one adapted to engage and shift said rod when the spindle reaches a predetermined upper position and the other adapted to engage and actuate said rod when the spindle reaches a predetermined lower position.

8. In a machine tool the combination of a translatable spindle, a rack thereon, a feed shaft, a first pinion on said feed shaft engaging said rack to effect translation of said spindle, the maximum range of available translation being determined by the length of said rack, power means, including a clutch, to rotate said feed shaft, safety limit trip means automatically to disengage said clutch thereby to render said power feed ineffective before said pinion engages the end of said rack, said means including a clutch actuating rod coaxial with said feed shaft and adapted by axial movement to disengage said clutch, a second pinion on said feed shaft; a rotatable member provided with an internal gear engaging said second pinion; a cam member of arcuate form having teeth on its outer periphery fitted within the teeth of said internal gear and held therein by the interlocking engagement of said teeth, cam device formed at each end of said cam member, one adapted to engage and shift said rod when the spindle reaches a predetermined upper position and the other adapted to engage and actuate said rod when the spindle reaches a predetermined lower position; and manually adjustable means automatically to disengage said clutch at any desired predetermined point intermediate the predetermined upper and lower positions of said spindle, including a manually adjustable dial coaxial with said rotatable member, a third cam device on said dial adapted to engage and shift said rod, means to adjust said dial to place said third cam at any desired place intermediate the two first mentioned cam devices, and means to clamp said dial to said rotatable member.

LAWRENCE L. SCHAUER.
AUGUSTUS M. SOSA.